(12) United States Patent
Zubas et al.

(10) Patent No.: US 9,380,423 B2
(45) Date of Patent: *Jun. 28, 2016

(54) MANAGING ACCESS TO MOBILE CONTENT USING LOCATION-BASED AND PRESENCE SERVICES

(71) Applicant: AT&T Mobility II LLC, Atlanta, GA (US)

(72) Inventors: Michael Zubas, Marietta, GA (US); Mark Causey, Tucker, GA (US); Adrianne Luu, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,783

(22) Filed: Oct. 5, 2015

(65) Prior Publication Data

US 2016/0029167 A1    Jan. 28, 2016

Related U.S. Application Data

(63) Continuation of application No. 13/662,606, filed on Oct. 29, 2012, now Pat. No. 9,154,912, which is a continuation of application No. 12/580,700, filed on Oct. 16, 2009, now Pat. No. 8,301,168.

(51) Int. Cl.
*H04W 4/00* (2009.01)
*H04W 4/02* (2009.01)
*H04M 1/725* (2006.01)

(52) U.S. Cl.
CPC .......... *H04W 4/021* (2013.01); *H04M 1/72547* (2013.01); *H04M 1/72552* (2013.01); *H04M 1/72572* (2013.01); *H04M 1/72577* (2013.01); *H04W 4/001* (2013.01); *H04W 4/02* (2013.01)

(58) Field of Classification Search
CPC ....... H04W 4/021; H04W 4/001; H04W 4/02; H04M 1/72577; H04M 1/72547; H04M 1/72572; H04M 1/72552
USPC ................. 455/456.1–457, 414.1–414.4, 566
See application file for complete search history.

(56) References Cited

U.S. PATENT DOCUMENTS

| | | |
|---|---|---|
| 5,649,300 A | 7/1997 | Snyder et al. |
| 6,091,956 A | 7/2000 | Hollenberg |
| 6,505,046 B1 | 1/2003 | Baker |
| 6,625,456 B1 | 9/2003 | Busso et al. |
| 6,941,154 B1 | 9/2005 | Ritter |
| 7,020,480 B2 | 3/2006 | Coskun et al. |
| 7,254,384 B2 | 8/2007 | Gailey et al. |
| 7,369,867 B2 | 5/2008 | Zabawskyj et al. |
| 7,450,954 B2 | 11/2008 | Randall |
| 7,734,702 B2 | 6/2010 | Kim |

(Continued)

OTHER PUBLICATIONS

PolicyFilter (SMS)—Operator protection against Faking, Flooding and Spoofing. User protection against spam, harassment and phishing. www.adaptivemobile.com (Aug. 10, 2007).

(Continued)

*Primary Examiner* — Sharad Rampuria
(74) *Attorney, Agent, or Firm* — Hartman & Citrin LLC

(57) ABSTRACT

Methods for selectively filtering message content received at a mobile device based upon a current location of the mobile device and/or a user's presence status and devices configured to selectively filter message content based upon a location of the mobile device and/or a user's presence status.

20 Claims, 6 Drawing Sheets

(56) References Cited

U.S. PATENT DOCUMENTS

| | | | |
|---|---|---|---|
| 7,769,633 B2 | 8/2010 | Jokinen et al. | |
| 7,769,767 B2 | 8/2010 | Petersen | |
| 7,907,940 B2 | 3/2011 | Ramer et al. | |
| 8,005,489 B2 | 8/2011 | Fransioli | |
| 8,019,055 B2 | 9/2011 | Grigoriev et al. | |
| 8,068,856 B2 | 11/2011 | Kwon | |
| 8,069,128 B2 | 11/2011 | Pujara | |
| 8,099,109 B2 | 1/2012 | Altman et al. | |
| 8,175,624 B2 | 5/2012 | Philbin et al. | |
| 8,285,310 B1 * | 10/2012 | Shrum, Jr. | H04W 48/18 370/338 |
| 8,428,562 B2 | 4/2013 | Luu et al. | |
| 2002/0102993 A1 | 8/2002 | Hendrey et al. | |
| 2003/0060211 A1 | 3/2003 | Chern et al. | |
| 2005/0043060 A1 | 2/2005 | Brandenberg et al. | |
| 2006/0089160 A1 | 4/2006 | Othmer | |
| 2006/0166679 A1 * | 7/2006 | Karaoguz | H04W 4/02 455/456.1 |
| 2007/0082658 A1 | 4/2007 | Tengler et al. | |
| 2008/0004048 A1 | 1/2008 | Cai et al. | |
| 2008/0071616 A1 * | 3/2008 | Hovnanian | G06Q 30/02 705/14.54 |
| 2008/0320577 A1 | 12/2008 | Larduinat | |
| 2009/0176520 A1 | 7/2009 | B. S. et al. | |
| 2009/0177750 A1 | 7/2009 | Lee et al. | |
| 2010/0099444 A1 | 4/2010 | Coulter et al. | |
| 2011/0034147 A1 | 2/2011 | Issa et al. | |
| 2011/0065451 A1 | 3/2011 | Danado et al. | |
| 2011/0106896 A1 * | 5/2011 | Baransky | G06Q 10/109 709/206 |
| 2013/0274997 A1 * | 10/2013 | Chien | G06F 17/00 701/36 |
| 2014/0282816 A1 * | 9/2014 | Xie | H04L 63/0227 726/1 |
| 2014/0323079 A1 * | 10/2014 | Paolini | G08B 25/016 455/404.2 |

OTHER PUBLICATIONS

Locale-Product, www.twofortyfouram.com/product, 2014.
U.S. Office Action dated Mar. 2, 2012 in U.S. Appl. No. 12/580,700.
U.S. Notice of Allowance dated Jul. 5, 2012 in U.S. Appl. No. 12/580,700.
U.S. Notice of Allowance dated Feb. 13, 2015 in U.S. Appl. No. 13/662,606.
U.S. Notice of Allowance dated May 21, 2015 in U.S. Appl. No. 13/662,606.

* cited by examiner

FIG. 6

MANAGING ACCESS TO MOBILE CONTENT USING LOCATION-BASED AND PRESENCE SERVICES

CROSS-REFERENCE TO RELATED APPLICATIONS

This application is a continuation of and claims priority to U.S. patent application Ser. No. 13/662,606, entitled "Devices and Methods for Selectively Filtering Message Content," filed Oct. 29, 2012, now U.S. Pat. No. 9,154,912, which is a continuation of and claims priority to U.S. patent application Ser. No. 12/580,700, entitled "Devices and Methods for Selectively Filtering Message Content," filed Oct. 16, 2009, now U.S. Pat. No. 8,301,168. U.S. patent application Ser. No. 13/662,606 and U.S. patent application Ser. No. 12/580,700 are incorporated herein by reference in their entireties.

TECHNICAL FIELD

The present disclosure relates generally to content filtering and, more particularly, to devices and methods for selectively filtering message content based upon location and/or user presence status.

BACKGROUND

Text and multimedia messaging are popular methods of communication used by an increasing number of wireless service subscribers worldwide. Text messaging offers a convenient way for people to engage in quick, text-based conversations. Multimedia messaging offers a similarly convenient way for people to exchange images, audio, and/or video, sometimes in addition to text.

Most text and multimedia messaging sessions can be conducted in a discrete manner. When a user is not available to receive an incoming message, the message may be inadvertently disclosed to prying eyes or may be subject to discovery by co-workers, family, friends, or other people who the user does not want viewing the message for one reason or another.

SUMMARY

According to one aspect of the present disclosure, a method for selectively filtering message content received at a mobile device based upon a current location of the mobile device is disclosed. The method includes detecting a message being received at a mobile device. The message includes message content that is considered appropriate or inappropriate based upon a current location of the mobile device and a filtering rule established for the current location. The method further includes determining the current location of the mobile device using a location component of the mobile device and analyzing the message content to determine whether any portion of the message content is inappropriate based upon the filtering rule established for the current location. If it is determined that the message content is appropriate, the method further includes presenting all of the message content to a user of the mobile device. If it is determined that any portion of the message content is inappropriate, the method further includes modifying the inappropriate portion of the message content, such that the inappropriate portion is indiscernible to the user when the mobile device is at the current location, presenting only the appropriate portion of the message content to the user of the mobile device, monitoring movement of the mobile device from the current location to a safe location, whereat a filtering rule established for the safe location considers the inappropriate portion of the message content to be appropriate when the mobile device is at the safe location, modifying the message content based upon the filtering rule established for the safe location, such that previously considered inappropriate portion is available to the user when the mobile device is at the safe location; and presenting the message content to the user of the mobile device.

In some embodiments, the message is a text message and the message content is text. In other embodiments, the message is a multimedia message and the message content is some combination of text, graphics, audio, and video.

In some embodiments, the filtering rule is established for the current location and an additional location. In other embodiments, the filtering rule is defined based upon criteria set by the user of the mobile device. In still other embodiments, the filtering rule is defined based upon criteria set by the user of the mobile device. In further embodiments, the filtering rule is defined based upon criteria set by a wireless service provider. In some embodiments, the filtering rule is defined based upon a content rating assigned to the message content.

In some embodiments, modifying the inappropriate portion of the message content includes blocking the inappropriate portion of the message content, and modifying the message content based upon the filtering rule established for the safe location includes unblocking the previously considered inappropriate portion of the message content. In other embodiments, modifying the inappropriate portion of the message content includes temporarily removing the inappropriate portion of the message content, and modifying the message content based upon the filtering rule established for the safe location includes adding the previously considered inappropriate portion of the message content back into the message content. In still other embodiments, modifying the inappropriate portion of the message content includes altering the inappropriate portion of the message content, and modifying the message content based upon the filtering rule established for the safe location includes undoing the altering of the previously considered inappropriate portion of the message content.

According to another aspect of the present disclosure, a mobile device is configured to selectively filter message content based upon a location of the mobile device. The mobile device includes a transceiver for receiving message content, a processor, and a memory, in communication with the processor, the memory being configured to store instructions that are executable by the processor to carry out various functions. The instructions cause the processor to detect a message being received, via the transceiver, at the mobile device. The message includes message content that is considered appropriate or inappropriate based upon a current location of the mobile device and a filtering rule established for the current location. The instructions further cause the processor to determine the current location of the mobile device using a location component of the mobile device, and analyze the message content to determine whether any portion of the message content is inappropriate based upon the filtering rule established for the current location. If it is determined that all of the message content is appropriate, the instructions cause the processor to present the message content to a user of the mobile device. If it is determined that any portion of the message content is inappropriate, the instructions cause the processor to: modify the inappropriate portion of the message content, such that the inappropriate portion is not available to the user when the mobile device is at the current location, present only the appropriate portion of the message content to the user of the mobile device, monitor movement of the mobile device from the current location to a safe location, whereat a filtering rule established for the safe location considers the inappropriate portion of the message content to be appropriate when the mobile device is at the safe location, modify the message content based upon the filtering rule established for the safe location, such that previously considered inappropriate portion is available to the user when the mobile device is at the safe location, and present the message content to the user of the mobile device.

According to another aspect of the present disclosure, a method for selectively filtering message content received at a mobile device based upon a current presence status of a user of the mobile device includes detecting a message being received at a mobile device. The message includes message content that is considered appropriate or inappropriate based upon a current presence status of the mobile device and a filtering rule established for the current presence status. The method further includes analyzing the message content to determine whether any portion of the message content is inappropriate based upon the filtering rule established for the current presence status.

If it is determined that the message content is appropriate, the method further includes presenting the message content to a user of the mobile device. If it is determined that any portion of the message content is inappropriate, the method further includes modifying the inappropriate portion of the message content, such that the inappropriate portion is indiscernible to the user when the current presence status is active, presenting only the appropriate portion of the message content to the user of the mobile device, detecting a change from the current presence status to a new presence status, the new presence status triggering a new filtering rule to be implemented that considers the previously considered inappropriate portion of the message content as being appropriate for the new presence status, modifying the message content based upon the new filtering rule, such that the previously considered inappropriate portion is available to the user, and presenting the message content to the user of the mobile device.

In some embodiments, the filtering rule is defined based upon criteria set by the user of the mobile device. In some embodiments, the filtering rule is defined based upon a content rating assigned to the message content. In some embodiments, the filtering rule is defined based upon criteria set by a wireless service provider.

In some embodiments, modifying the inappropriate portion of the message content includes blocking the inappropriate portion of the message content and modifying the message content based upon the new filtering rule includes unblocking the previously considered inappropriate portion of the message content. In other embodiments, modifying the inappropriate portion of the message content includes temporarily removing the inappropriate portion of the message content and modifying the message content based upon the filtering rule established for the safe location includes adding the previously considered inappropriate portion of the message content back into the message content. In other embodiments, modifying the inappropriate portion of the message content includes altering the inappropriate portion of the message content and modifying the message content based upon the new filtering rule includes undoing the altering of the previously considered inappropriate portion of the message content.

In some embodiments, the message is a text message including text as the message content. In other embodiments, the message is a multimedia message including some combination of text, graphics, audio, and video.

BRIEF DESCRIPTION OF THE DRAWINGS

FIG. 6 illustrates a GUI of a message content filtering application operating on the exemplary mobile device of FIG. 2, according to another embodiment of the present disclosure.

DETAILED DESCRIPTION

Figure 1:
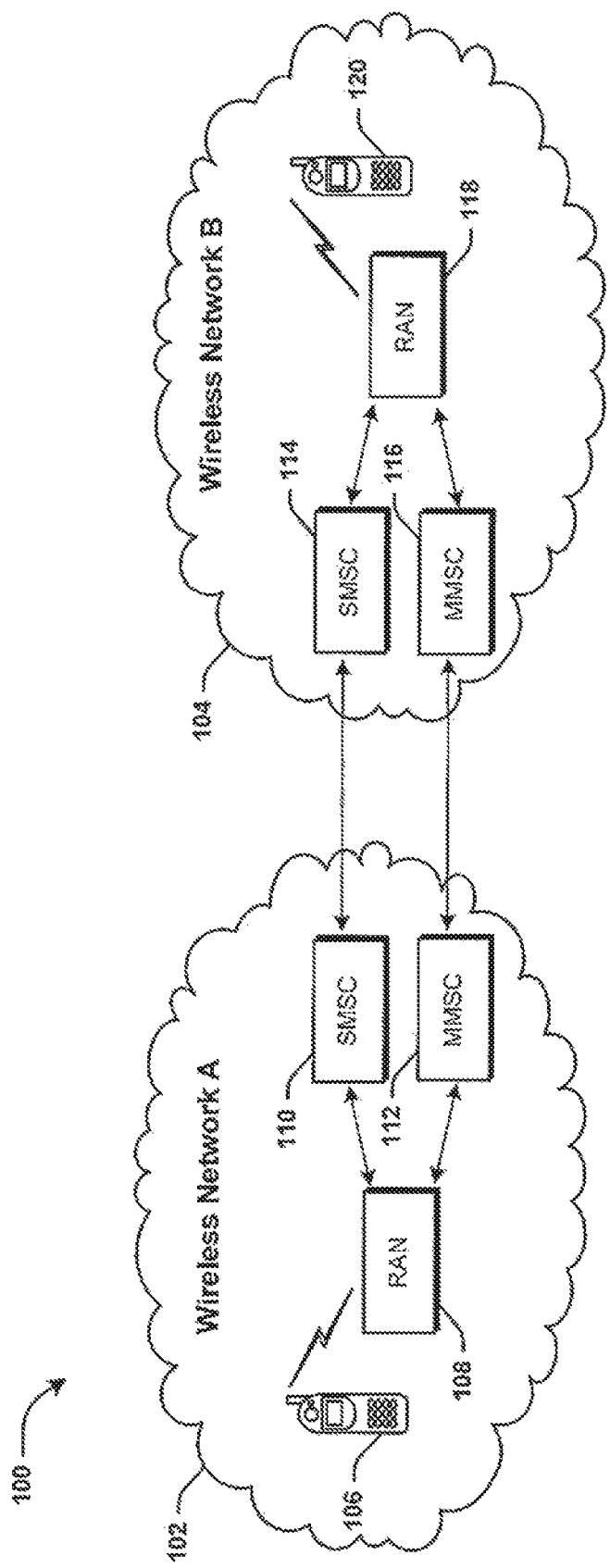
FIG. 1 illustrates an exemplary wireless communications network system in which the devices of the present disclosure may operate, according to an embodiment of the present disclosure.

As required, detailed embodiments of the present disclosure are provided herein. The disclosed embodiments are merely examples that may be embodied in various and alternative forms, and combinations thereof. As used herein, for example, exemplary, and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the devices and methods of the present disclosure. Therefore, specific structural and functional details disclosed herein are not to be interpreted as limiting, but merely as a basis for the claims and as a representative basis for teaching one skilled in the art to variously employ the present disclosure.

The devices and methods of the present disclosure are described in context of a Global System for Mobile communications (GSM) network and a Universal Mobile Telecommunications System (UMTS) network and, in particular, wireless messaging within these network types. It should be understood that the present disclosure is not limited to GSM and UMTS networks. Rather, the present disclosure is applicable to any existing or yet to be developed telecommunications technology that supports Short Message Service (SMS) messaging, Enhanced Message Service (EMS) Messaging, and/or Multimedia Message Service (MMS) messaging services. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G, 3G (third generation), and above (4G and beyond) technologies. Examples of suitable data bearers, for example to support multimedia messaging services, include General Packet Radio Service (GPRS), Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data bearers.

While the methods of the present disclosure are often described in a general context of computer-executable instructions, the methods of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Referring now to FIG. 1, an exemplary wireless communications network 100 is illustrated, according to an embodiment of the present disclosure. The wireless communications network 100 provides a suitable environment in which mobile devices exchange messages including, for example, Short Message Service (SMS), Enhanced Message Service (EMS), and Multimedia Message Service (MMS) messages. The messages each include message content, which includes text, graphics, audio, and/or video.

Text may include numbers, letters, characters, symbols, combinations thereof, and the like. Graphics may include images, pictures, computer-generated graphics, combinations thereof, and the like. Audio may include music, ringtones, spoken word, podcasts, sounds, combinations thereof, and the like. Video may include recorded video, live video, animated video, video, computer-generated video, combinations thereof, and the like.

The illustrated wireless communications network system 100 includes two wireless networks, wireless network A 102 and wireless network B 104. The illustrated wireless network A 102 includes a mobile device 106, such as a cellular telephone, wireless messaging device, computer of any form factor (e.g., laptop, notebook, netbook, subnotebook, etc.), or the like. As a computer, the mobile device 106 may be configured with a fixed or removable network access card (not shown) to allow a user to access the wireless network A 102. In this embodiment, the computer may also be configured with messaging software to support SMS, EMS, and/or MMS messaging.

The illustrated mobile device 106 is in communication with a radio access network (RAN) 108. The RAN 108 includes at least one base transceiver station (BTS), commonly referred to as a cell tower. The BTS provides the air/radio interface by which the mobile device communicates wirelessly with wireless network A 102. Each BTS is in communication with a base station controller (BSC) (not shown). A BSC allocates radio resources to the mobile device, administers frequencies, and controls handovers between BTSs. A BSC communicates with a circuit-switched core network and packet-switched core network via a mobile switching center (MSC) and serving GPRS support node (SGSN), respectively (components not shown). MSC, SGSN and other network elements of the core networks are not illustrated so as not to distract from the various aspects of the present disclosure.

Wireless network A 102 also includes an SMS service center (SMSC) 110 and an MMS service center (MMSC) 112, both illustrated as being capable of communication with wireless network B 104 through an SMSC 114 and an MMSC 116 of wireless network B 104. The SMSCs 110, 114 are a combination of hardware and software, and are responsible for receiving, storing, and forwarding SMS messages in accordance with SMS standard protocols. In some embodiments, SMS messages are received from a sending mobile device (e.g., the mobile device 106 or the mobile device 120), stored until a recipient mobile device (e.g., the mobile device 120 or the mobile device 106) is available, and forwarded to the recipient mobile device. In other embodiments, SMS messages are received from an SMS entity (not shown), stored until the destination mobile device 106, 120 is available, and forwarded to the destination mobile device 106, 120. The SMS entity may be, for example, a voicemail server that provides voicemail notifications via SMS, an advertising server, an Internet website, an e-mail server that provides e-mail notifications via SMS, a computer-based SMS client, and the like.

The MMSCs 112, 116 provide a similar store and forward function for MMS messages in accordance with MMS standard protocols. The MMSCs 112, 116 are a combination of hardware and software. For example, the MMSCs 112, 116 are responsible for receiving MMS message content, storing the message content, dynamically generating an URL link for the message content, generating an MMS notification message including an URL pointer to the dynamically generated URL link, sending the MMS notification message to a designated recipient mobile device, and providing the MMS message content upon request from the recipient mobile device. In some embodiments, the MMSCs 112, 116 are configured to communicate with a wireless application protocol (WAP) proxy server/gateway to provide the MMS message to the recipient device. In some embodiments, the MMSCs 112, 116 are configured to communicate with the SMSCs 110, 114 to perform various functions, such as sending an MMS notification message to the recipient mobile device via WAP push over SMS.

Wireless network B 104 also includes a RAN 118 that facilitates communication between a second mobile device 120 and the SMSC 114 and/or the MMSC 116. The mobile device 120 may be any of the aforementioned device types, similar to the mobile device 106 as described above.

In some embodiments, a user of the first mobile device 106 and a user of the second mobile device 120 communicate using SMS, EMS, and/or MMS messaging services. In the illustrated embodiment, wireless network A 102 and wireless network B 104 are separate wireless networks. In some embodiments, wireless network A 102 and wireless network B 104 are operated by different service providers. In other embodiments, wireless network A 102 and wireless network B 104 are operated by the same service provider. In some embodiments, the mobile devices 106, 120 operate in the same wireless network. The mobile devices 106, 120 may exchange messages with other mobile devices (not illustrated) operating in the illustrated wireless communications network 100 or another wireless or landline network (not illustrated).

Figure 2:
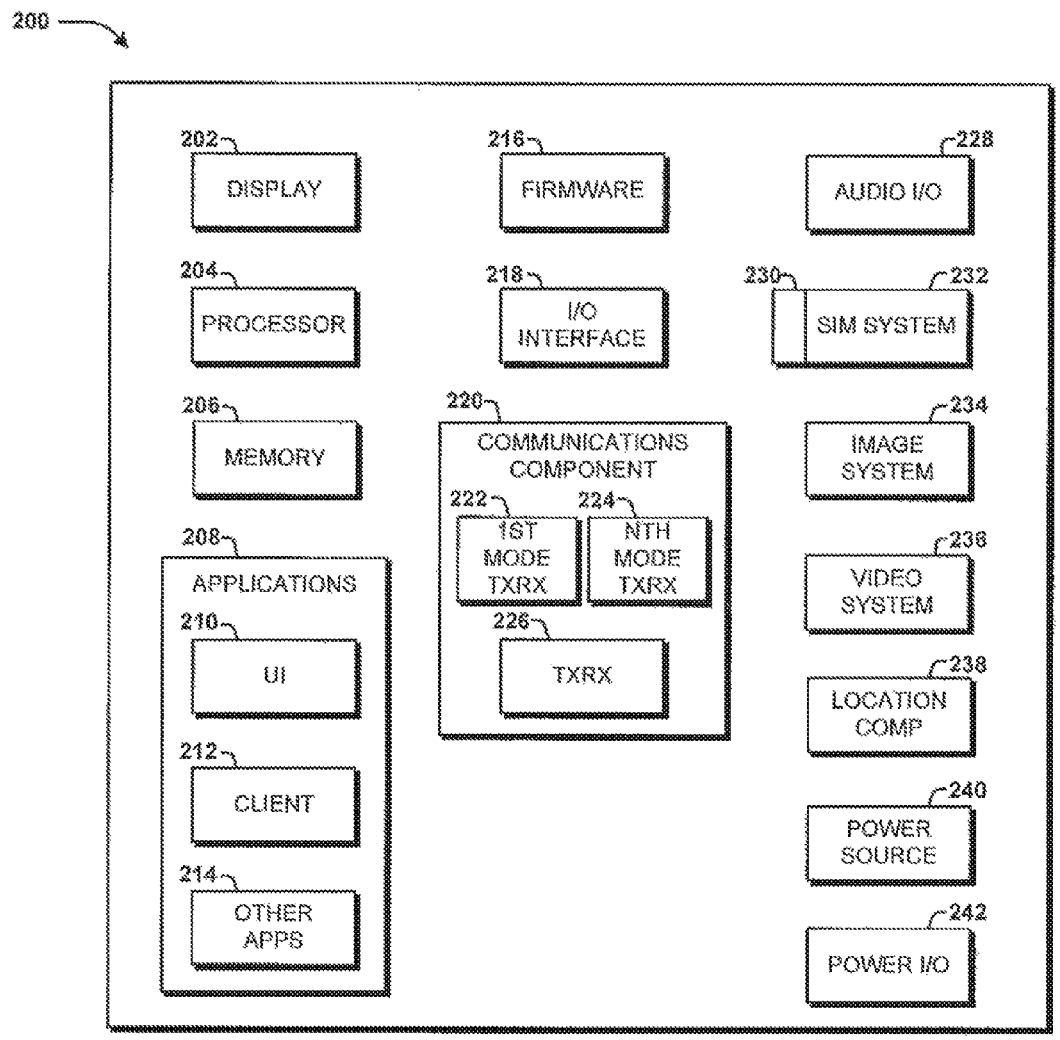
FIG. 2 illustrates an exemplary mobile device and components thereof, according to an embodiment of the present disclosure.

Referring now to FIG. 2, a schematic block diagram of an exemplary mobile device 200 is illustrated. Although connections are not shown between the components illustrated in FIG. 2, the components can interact with each other to carry out device functions. In some embodiments, for example, the components are arranged so as to communicate via one or more busses (not shown). It should be understood that FIG. 2 and the following description are intended to provide a general understanding of a suitable environment in which the various aspects of some embodiments of the present disclosure can be implemented.

In some embodiments, the mobile devices 106, 120 illustrated in FIG. 1 are configured like the mobile device 200, now described in detail. In some embodiments, the mobile device 200 is a multimode headset and has a variety of computer readable media, including, for example, volatile media, non-volatile media, removable media, and non-removable media. The term "computer-readable media" and variants thereof, as used in the specification and claims, refers to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 200.

Figure 5:
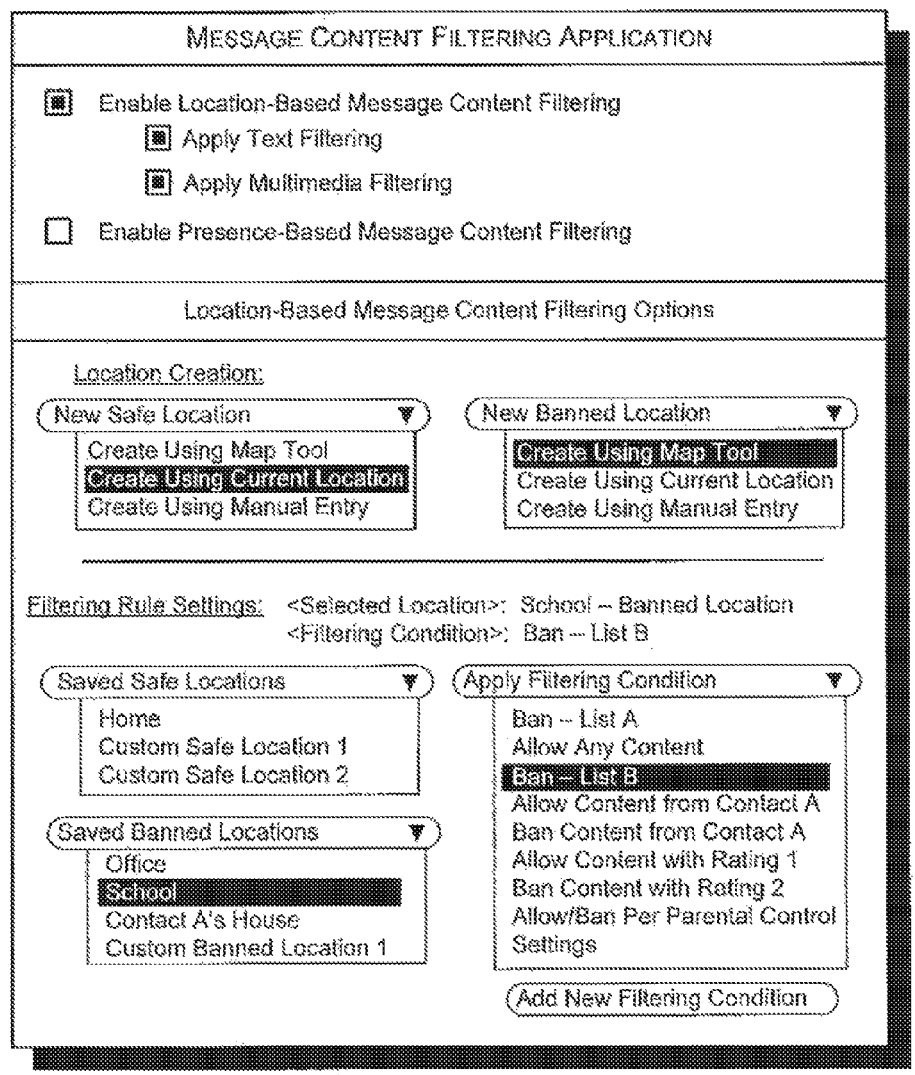
FIG. 5 illustrates an exemplary Graphical User Interface (GUI) of a message content filtering application operating on the exemplary mobile device of FIG. 2, according to one embodiment of the present disclosure.
Figure 6:
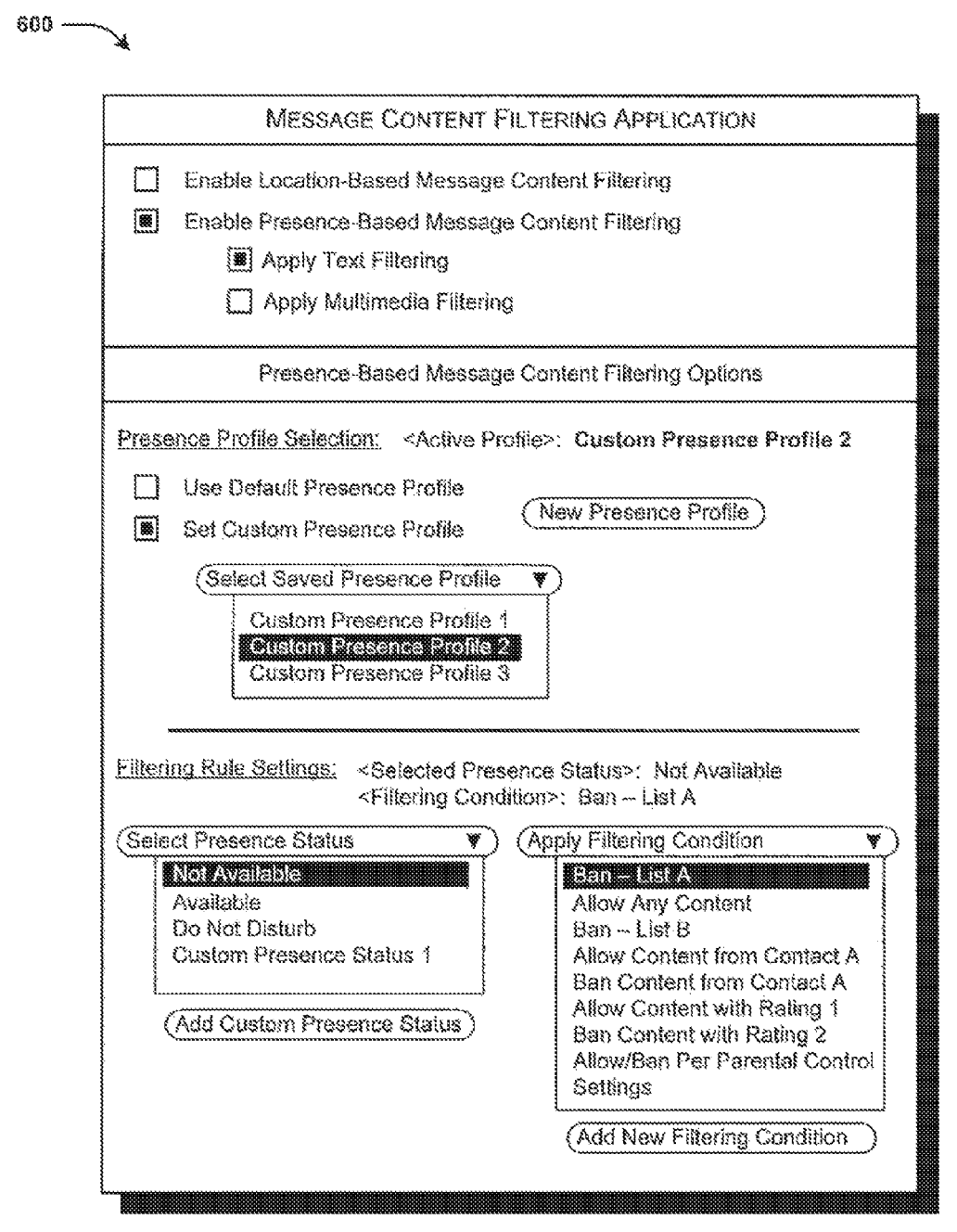

As illustrated in FIG. 2, the mobile device 200 includes a display 202 for displaying multimedia such as, for example, application graphical user interfaces (GUIs) (e.g., as illustrated in FIGS. 5, 6), text, images, video, telephony functions such as Caller ID data, setup functions, menus, music, metadata, messages, wallpaper, graphics, Internet content, device status, preferences settings, map and location data, presence profile selection, and the like. The illustrated mobile device 200 also includes a processor 204 for processing data and/or executing computer-executable instructions of one or more applications, and a memory 206 for storing data and/or one or more applications 208.

In some embodiments, the application(s) 208 include a user interface (UI) application 210. The UI application 210 interfaces with a client 212 (e.g., an operating system (OS)) to facilitate user interaction with device functionality and data. In some embodiments, the client 212 is one of Symbian OS, Microsoft® Windows® Mobile OS (available from Microsoft® Corporation of Redmond, Wash.), Palm® webOS™ (available from Palm® Corporation of Sunnyvale, Calif.), Palm® OS (available from Palm® Corporation of Sunnyvale, Calif.), RIM® BlackBerry® OS (available from Research In Motion Limited of Waterloo, Ontario, Canada), Apple® iPhone® OS (available from Apple® Corporation of Cupertino, Calif.), or Google™ Android™ OS (available from Google™ of Mountain View, Calif.). These operating systems are merely exemplary of the operating systems that can be used in accordance with the embodiments disclosed herein. Other operating systems are contemplated.

The UI application 210 aids a user in entering message content, viewing received messages, answering/initiating calls, entering/deleting data, entering and setting user IDs and passwords, configuring settings, manipulating address book content and/or settings, interacting with other applications 214, and the like. In some embodiments, the other applications 214 include, for example, message content filtering applications, messaging applications (e.g., SMS, EMS, MMS applications) presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 208 are stored in the memory 206 and/or in a firmware 216, and are executed by the processor 204. The firmware 216 may also store code for execution during device 200 power up, for example.

The illustrated mobile device 200 also includes an input/output (I/O) interface 218 for input/output of data, such as, for example, location information, filtering rule information, presence status information, selecting message content filtering options, user IDs, passwords, and application initiation (start-up) requests. In some embodiments, the I/O interface 218 is a hardwire connection, such as, for example, a USB, mini-USB, audio jack, PS2, IEEE 1394, serial, parallel, Ethernet (RJ48) port, RJ11 port, or the like. In some embodiments, the I/O interface 218 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 218 may be used for communications between the mobile device 200 and a network or local device, instead of, or in addition to, a communications component 220.

The communications component 220 interfaces with the processor 204 to facilitate wired/wireless communications with external systems. Example external systems include, but are not limited to, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 220 includes a multimode communications subsystem for providing cellular communications via different cellular technologies. In some embodiments, for example, a first cellular transceiver 222 operates in one mode, such as, Global System for Mobile communications (GSM), and an Nth cellular transceiver 224 operates in a different mode, such as Universal Mobile Telecommunications System (UMTS). While only two cellular transceivers 222, 224 are illustrated, it should be appreciated that a plurality of transceivers can be included.

The illustrated communications component 220 also includes an alternative communications transceiver 226 for use by other communications technologies such as, for example, WIFI, WIMAX, BLUETOOTH, infrared, infrared data association (IRDA), near field communications (NFC), RF, and the like. In some embodiments, the communications component 220 also facilitates reception from terrestrial radio networks, digital satellite radio networks, Internet-based radio services networks, combinations thereof, and the like. The communications component 220 can process data from a network such as, for example, the Internet, an intranet (e.g., business intranet), a home broadband network, a WIFI hotspot, and the like, via an ISP, DSL provider, or broadband provider. In some embodiments, the communications component 220 facilitates the transmission of authentication information from the mobile device 200 to a network for processing in accordance with the methods described herein.

Audio capabilities for the mobile device 200 can be provided by an audio I/O component 228 that includes a speaker for the output of audio signals and a microphone to collect audio signals.

The illustrated mobile device 200 also includes a slot interface 230 for accommodating a subscriber identity system 232 such as, for example, a subscriber identity module (SIM) card or universal SIM (USIM) card. Alternatively, the subscriber identity system 232 may be manufactured into the device 200, thereby obviating the need for a slot interface 230. In some embodiments, the subscriber identity system 232 is programmed by a manufacturer, a retailer, a user, a computer, a network operator, or the like.

The illustrated mobile device 200 also includes an image capture and processing system 234 (image system). Photos may be obtained via an associated image capture subsystem of the image system 234, for example, a camera. The illustrated mobile device 200 also includes a video system 236 for capturing, processing, recording, modifying, and/or transmitting video content. Photos and videos obtained using the image system 234 and the video system 236, respectively, may be added as message content to an MMS message and sent to another mobile device.

The illustrated mobile device 200 also includes a location component 238 for sending and/or receiving signals such as, for example, GPS data, assisted GPS (A-GPS) data, WIFI/WIMAX and/or cellular network triangulation data, combinations thereof, and the like, for determining a location of the mobile device 200. In some embodiments, the location component 238 interfaces with cellular network nodes, telephone lines, satellites, location transmitters and/or beacons, wireless network transmitters and receivers, for example, WIFI hotspots, radio transmitters, combinations thereof, and the like. In some embodiments, the mobile device 200 is configured to determine whether message content received in a message is appropriate for a given location of the mobile device 200 determined using the location component 238, as will be described in further detail below with reference to FIG. 3.

Using the location component 238, the mobile device 200 obtains, generates, and/or receives data to identify its location, or transmits data used by other devices to determine the location of the mobile device 200. In some embodiments, the location of the mobile device 200 is used by a message content filtering application to determine whether message content of a received message is appropriate or inappropriate for the location of the mobile device 200. The message content filtering application also determines whether inappropriate content should be treated as appropriate after the mobile device 200 travels to a new, safe location. An exemplary method for selectively filtering message content received at the mobile device 200 based upon a current location of the mobile device 200 is described below with reference to FIG. 3. An exemplary GUI of a message content filtering application is illustrated in FIGS. 5 and 6.

The illustrated mobile device 200 also includes a power source 240, such as batteries and/or other power subsystem (AC or DC). The power source 240 can interface with an external power system or charging equipment via a power I/O component 242.

Figure 3:
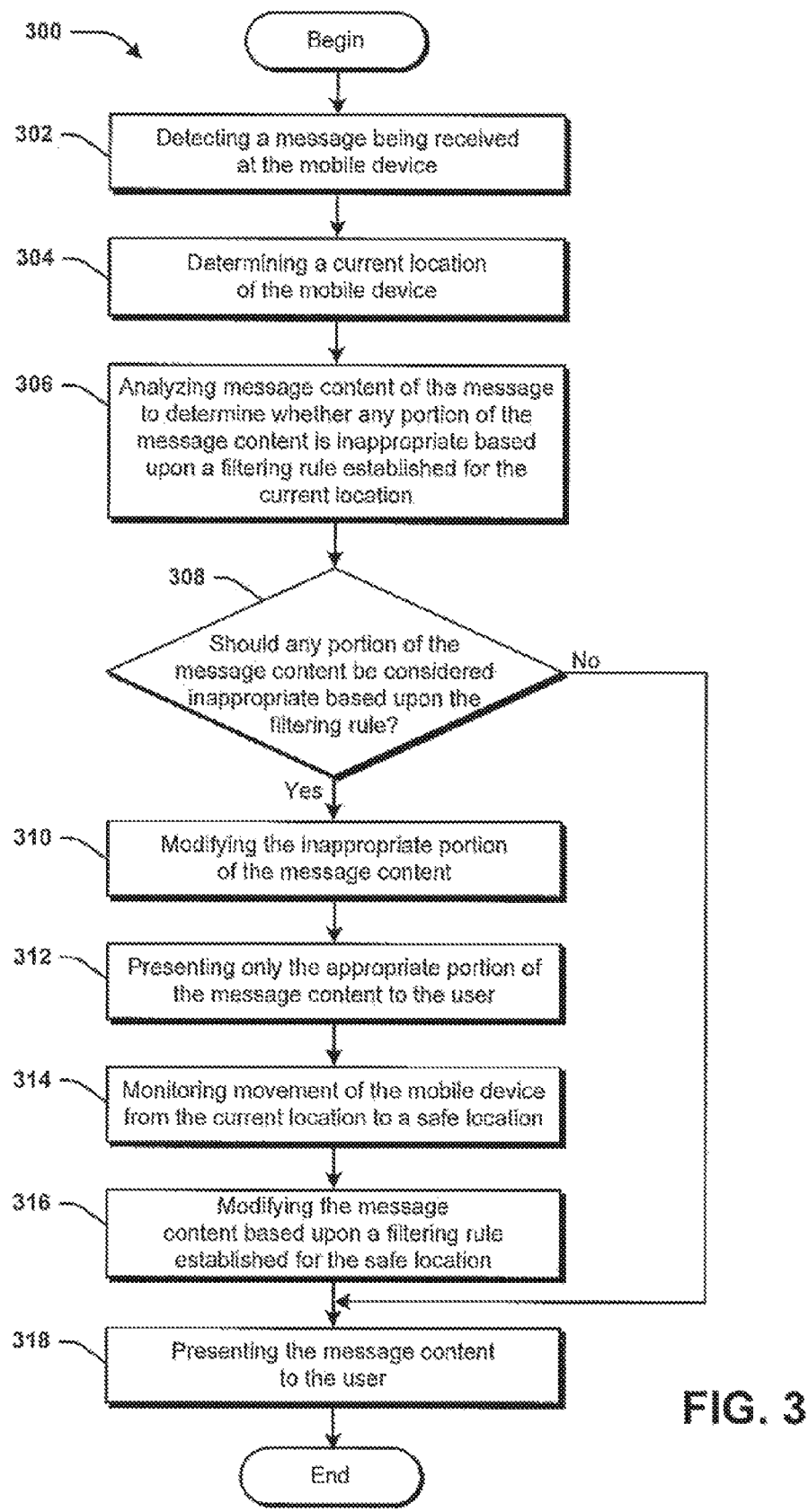
FIG. 3 illustrates an exemplary method for selectively filtering message content received at a mobile device based upon a current location of the mobile device, according to an embodiment of the present disclosure.

Referring now to FIG. 3, a method 300 for selectively filtering message content received at the mobile device 200 based upon a current location of the mobile device is illustrated, according to an embodiment of the present disclosure. It should be understood that the steps of the method 300 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. In certain embodiments, some or all steps of this process, and/or substantially equivalent steps can be performed by execution of computer-readable instructions stored or included on a computer readable medium, such as the memory 206 of the mobile device 200. In some embodiments, the other applications 214 of the mobile device 200 include a message content filtering (MCF) application configured to perform the steps of the method 300.

The method 300 begins and flow proceeds to block 302, whereat the MCF application detects a message being received. The message may be an SMS message, an EMS message, or an MMS message, as described above. The message includes message content, such as text, graphics, audio, and/or video. At block 304, the MCF application determines the current location of the mobile device 200. The mobile device 200 may use the location component 238 to determine its location. A message content filtering application may be configured to communicate with a LSA to obtain the current location of the mobile device.

At block 306, the MCF application analyzes the message content to determine whether any portion of the message content is considered inappropriate by the user of the mobile device 200 based upon a filtering rule established for the current location. The filtering rule may include a location definition defining whether a given location is considered safe or banned and at least one filtering condition for the given location.

The location definition may be a precise location defined by a physical address or latitude/longitude coordinates, for example. Alternatively, the location definition may define an area of any shape and size. In some embodiments, the location definition includes a location center and an area including a specified distance around the location center. The location definition may be user definable or may be dynamically generated based upon movement patterns of the mobile device 200 with or without additional input from a user.

In some embodiments, a banned location is defined but a safe location is not defined. In this case, when the mobile device 200 leaves a banned location, the mobile device 200 enters what is considered by the MFC application to be a default safe location and modifies a message based upon a default filtering rule, such as allowing all or some content at the default safe location.

The MCF application may provide several ways for a user to create a new safe or banned location. For example, the MCF application may provide an option to create a new location using a map tool, using a current location of the mobile device 200, or by manually entering location information. These and other options are described in further detail with reference to FIG. 5.

The filtering rule includes at least one filtering condition for a given safe or banned location. Filtering conditions include, but are not limited to, allow/ban content based upon a specified list of content (e.g., words, phrases, characters, letters, numbers, symbols, graphic file names, explicit graphic types, video file names, explicit video types, spoken words, music types, ringtone types, and explicit audio types) allow/ban all content, allow/ban content from a contact, allow/ban pre-rated content based upon the rating, allow/ban based upon parental control settings, and the like.

At decision block 308, a determination is made as to whether any portion of the message content should be considered inappropriate based upon the filtering rule established for the current location. If it is determined that any portion of the message content should be considered inappropriate, flow is to block 310. At block 310, the MCF application modifies the inappropriate portion of the message content such that the inappropriate portion is indiscernible to the user when the mobile device 200 is in the current location.

In some embodiments, the MCF application modifies the inappropriate portion of the message content by blocking the inappropriate portion of the message content. Blocking text, video, and/or graphics content may include blacking out, graying out, whiting out, or otherwise covering the inappropriate portion of the message content such that it is not viewable.

In some embodiments, the MCF application modifies the inappropriate portion of the message content by temporarily removing the inappropriate portion of the message content. When the mobile device 200 arrives at a safe location, the temporary removal of the inappropriate portion is lifted. The previously considered inappropriate portion is then considered appropriate by the MCF application and available to be presented to the user on the mobile device 200.

In some embodiments, the MCF application modifies the inappropriate portion of the message content by altering the inappropriate portion of the message content. Altering audio content may include introducing noise into the audio signal, introducing other audio into the audio signal, distorting the audio, speeding up or slowing down playback of the audio, changing the frequency of the audio, or otherwise altering the audio such that the audio is not discernable. Altering video content may include introducing frames to the video, introducing artifacts, introducing clipping, introducing aliasing, distorting the video, blurring the video, increasing or decreasing the frame rate, introducing other video, or otherwise altering the video such that the video is not discernable. Altering text content may include adding characters, symbols, numbers, and/or letters to the text content, changing the text content to other characters, symbols, numbers, and/or letters, removing a portion of the text so that the remaining portion is not discernable, skewing the text, blurring the text, introducing artifacts, increasing/decreasing the size of the text, distorting the text, changing the orientation of the text, or otherwise altering the text. Altering graphics may include, but is not limited to, filtering the graphics with at least one filter, introducing artifacts, introducing aliasing, blurring the graphics, stretching the graphics, increasing/decreasing the size of the graphics, changing the orientation of the graphics, distorting the graphics, or otherwise altering the graphics.

Returning to FIG. 3, at block 312, the MCF application presents only the appropriate portion of the message content to the user. The MCF application generally presents the appropriate portion in a manner consistent with the type of message content included in the appropriate portion. For example, text will be presented as text on a display, such as the display 202 of the mobile device 200, as will graphics and video, and audio will be presented using a speaker of the mobile device 200, headphones or external speakers (e.g., vehicle, stationary, or portable speakers) connected to a headphone jack of the mobile device, or via another audio output device, such as the audio I/O 228. It is also contemplated that text content may be converted to audio content via a text-to-speech application (e.g., one of the other applications 214) stored in the memory 206 of the mobile device, and that audio content may be converted to text content via a speech-to-text application (e.g., one of the other applications 214).

At block 314, the MCF application monitors the movement of the mobile device 200, for example, using the location component 238 of the mobile device 200. In some embodiments, the MCF application requests location information periodically from the location component 238 or a location services other application of the other applications 214. When the mobile device 200 enters a location defined as a safe location, at block 316, the MCF application modifies the message content based upon a filtering rule established for the safe location. The message content previously considered to be inappropriate at the original location (current location above) may now considered appropriate and is modified accordingly. For example, content modified to be indiscernible to the user or others is returned to its original condition. At block 318, the MFC application presents the message content to the user. The method 300 can end.

If, at block 308, it is determined that no portion of the message is considered inappropriate, flow is to block 318. At block 318, the MFC application presents the message content to the user. The method 300 can end.

Figure 4:
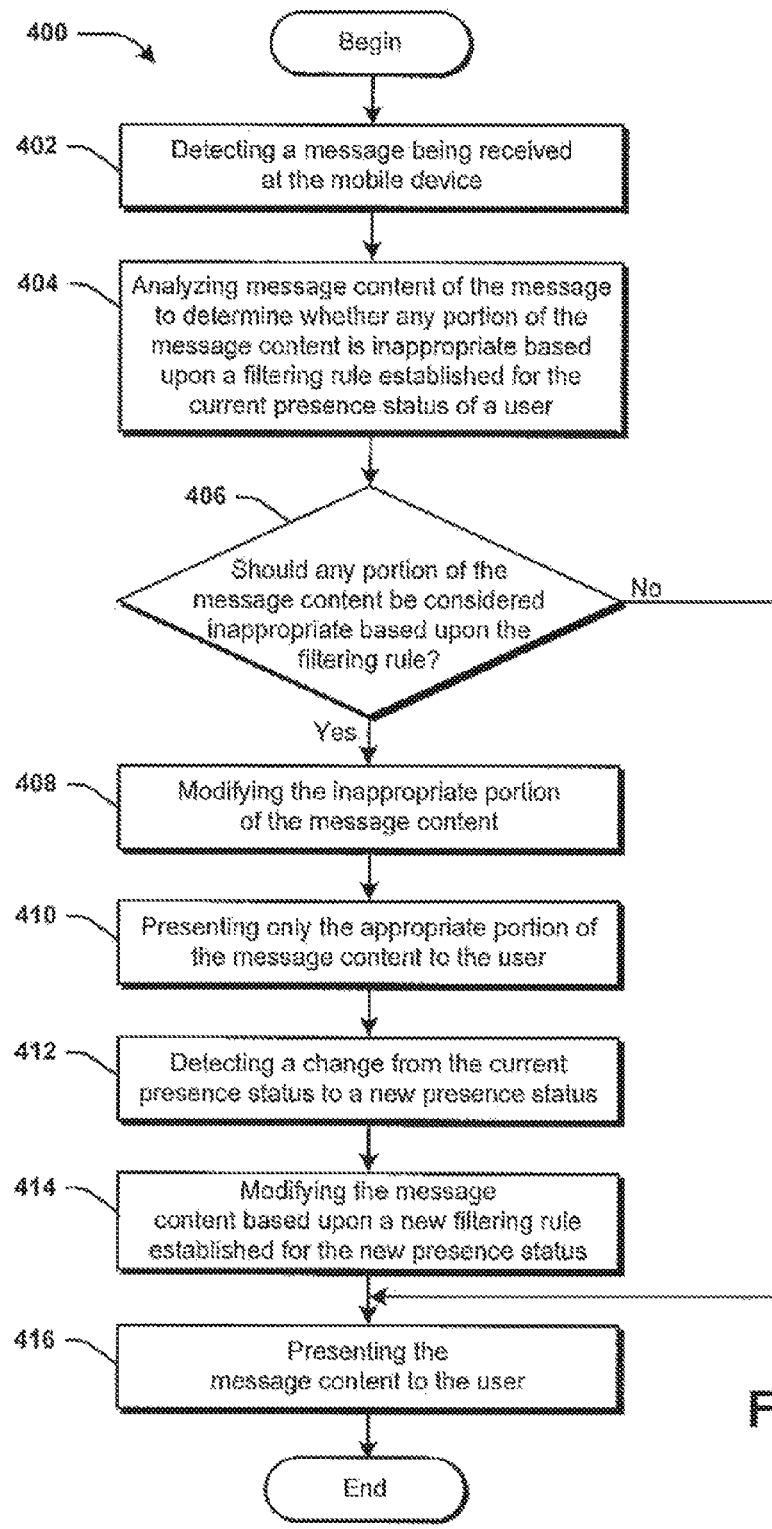
FIG. 4 illustrates an exemplary method for selectively filtering message content received at a mobile device based upon a current presence status of the mobile device, according to an embodiment of the present disclosure.

Referring now to FIG. 4, a method 400 for selectively filtering message content received at the mobile device 200 based upon a presence status of the mobile device is illustrated, according to an embodiment of the present disclosure. It should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. In certain embodiments, some or all steps of this process, and/or substantially equivalent steps can be performed by execution of computer-readable instructions stored or included on a computer readable medium, such as the memory 206 of the mobile device 200. In some embodiments, the applications 208 of the mobile device 200 include an MCF application configured to perform the steps of the method 400.

The term presence as used herein refers to, for example, the availability, activity level, or operating state of a user on a network. The ability for users to monitor each other's presence is a feature offered in connection with some messaging applications of the present disclosure (e.g., other applications 214). For example, some messaging applications have a buddy list or contact list feature that displays a contact list and a presence status for each contact in the list. The presence status indicates a user's availability and/or current activity so that others can determine whether to send a message to a particular contact. In context of the present method 400, a user's presence status, for example, available, not available, do not disturb, or custom status, is used by the MFC application to determine whether message content received in an SMS, EMS, or MMS message should be considered appropriate or inappropriate.

The method 400 begins and flow proceeds to block 402, whereat the MCF application detects a message being received. The message may be an SMS message, an EMS message, or an MMS message, as described above. The message includes message content, such as text, graphics, audio, and/or video. At block 404, the MCF application analyzes the message content to determine whether any portion of the message content would be considered inappropriate by the user of the mobile device 200 based upon a filtering rule established for the current presence status of the user. The filtering rule includes at least one filtering condition for a given presence status. Filtering conditions include, but are not limited to, allow/ban content based upon a specified list, allow/ban all content, allow/ban content from a contact, allow/ban pre-rated content based upon the rating, allow/ban based upon parental control settings, and the like.

At decision block 406, a determination is made as to whether any portion of the message content should be considered inappropriate based upon the filtering rule established for the current presence status. If it is determined that any portion of the message content should be considered inappropriate, flow is to block 408. At block 408, the MCF application modifies the inappropriate portion of the message content such that the inappropriate portion is indiscernible to the user when the mobile device 200 is in the current location.

In some embodiments, the MCF application modifies the inappropriate portion of the message content by blocking the inappropriate portion of the message content. Blocking text, video, and/or graphics content may include blacking out, graying out, whiting out, or otherwise covering the inappropriate portion of the message content such that it is not viewable. In some embodiments, the MCF application modifies the inappropriate portion of the message content by temporarily removing the inappropriate portion of the message content. In some embodiments, the MCF application modifies the inappropriate portion of the message content by altering the inappropriate portion of the message content. Altering audio content may include introducing noise into the audio signal, introducing other audio into the audio signal, distorting the audio, speeding up or slowing down playback of the audio, changing the frequency of the audio, or otherwise altering the audio such that the audio is not discernable. Altering video content may include introducing frames to the video, introducing artifacts, introducing clipping, introducing aliasing, distorting the video, blurring the video, increasing or decreasing the frame rate, introducing other video, or otherwise altering the video such that the video is not discernable. Altering text content may include adding characters, symbols, numbers, and/or letters to the text content, changing the text content to other characters, symbols, numbers, and/or letters, removing a portion of the text so that the remaining portion is not discernable, skewing the text, blurring the text, introducing artifacts, increasing/decreasing the size of the text, distorting the text, changing the orientation of the text, or otherwise altering the text. Altering graphics may include, but is not limited to, filtering the graphics, introducing artifacts, introducing aliasing, blurring the graphics, stretching the graphics, increasing/decreasing the size of the graphics, changing the orientation of the graphics, distorting the graphics, or otherwise altering the graphics.

Returning to FIG. 4, at block 410, the MCF application presents only the appropriate portion of the message content to the user. The MFC application generally presents the appropriate portion in a manner consistent with the type of message content included in the appropriate portion. For example, text will be presented as text on a display, such as the display 202 of the mobile device 200, as will graphics and video, and audio will be presented using a speaker of the mobile device 200, headphones or external speakers (e.g., vehicle, stationary, or portable speakers) connected to a headphone jack of the mobile device, or via another audio output device, such as the audio I/O 228. It is also contemplated that text content may be converted to audio content via a text-to-speech application (e.g., one of the other applications 214) stored in the memory 206 of the mobile device, and that audio content may be converted to text content via a speech-to-text application (e.g., one of the other applications 214).

At block 412, the MFC application detects a change from the current presence status to a new presence status. At block 414, the MFC application modifies the message content based upon a filtering rule established for the new presence status. The message content previously considered to be inappropriate under the previous presence status is now considered appropriate and is modified accordingly. For example, content modified to be indiscernible to the user or others is returned to its original condition. At block 416, the MFC application presents the message content to the user. The method 400 can end.

If, at block 406, it is determined that no portion of the message should be considered inappropriate, flow is to block 416. At block 416, the MFC application presents the message content to the user. The method 400 can end.

In some alternative embodiments, the methods 300, 400 may be performed based solely upon a time-based filtering rule or based upon a time-based filtering rule in addition to a location-based or presence-based filtering rule. Under certain time-based filtering rules, for example, message content is not filtered at all during certain time periods (e.g., weekends, after 6 PM, a particular date) even though the mobile device 200 is within a banned location or when the user's presence status is set such that certain message content should be banned.

Referring now to FIG. 5, an exemplary Graphical User Interface (GUI) 500 of an MCF application operating on the exemplary mobile device 200 of FIG. 2 is illustrated, according to one embodiment of the present disclosure. It should be understood that the layout, font type, font style, color, filtering options, menu design, and exemplary selection choices are provided merely as one embodiment in which a GUI of the MCF application may be configured and are not intended to reduce the scope of the appended claims.

The illustrated GUI 500 shows that an option has been selected to enable location-based message content filtering for text and multimedia content. Other options are available to enable presence-based message content filtering as an alternative to or in addition to the location-based filtering option, as described below with respect to FIG. 6.

The illustrated GUI 500 also includes options to create a new location definition for a safe or banned location. A safe location, for example, may be created or defined using a map tool, the current location of the mobile device 200, or manual entry. If the map tool option is selected, the user may be presented with a map on which the user defines boundaries of the safe location. In some embodiments, a user defines the safe location by drawing the boundaries of the safe location on a digital map. In some embodiments, a user defines a center point (e.g., manually entered or retrieved via the location component 238 of the mobile device 200) and a radius to define the safe location. If the current location option is selected, as illustrated, the MFC application will define the safe location for the current location. The MFC application may add a default distance (e.g., 50 feet, 100 feet, 2 miles, etc.) around the specified or determined location to be included in the safe location definition. Alternatively, the user may specify a distance around the current location to be included in the safe location definition.

If the manual entry option for location creation is selected, the user may enter at least one of country name, state name, province name, zip code, county name, city name, physical address, neighborhood, latitude/longitude coordinates, point-of-interest, or other information to define the safe location. The illustrated GUI 500 includes similar options to create a new banned location.

The illustrated GUI 500 also includes filtering rule settings. As illustrated, a user may select a saved safe location or a saved banned location and apply at least one filtering condition for that location. An option for adding new filtering conditions is also illustrated. In the illustrated example, a user has selected School and has applied a Ban-List B filtering condition, indicating that when the user's mobile device is located within a location defined for the banned location School, any message content that is included in list B is modified so as to be indiscernible to the user and other potential viewers/listeners until the mobile device 200 reaches a safe location.

Referring now to FIG. 6, an exemplary Graphical User Interface (GUI) 600 of an MCF application operating on the exemplary mobile device 200 of FIG. 2 is illustrated, according to one embodiment of the present disclosure. It should be understood that the layout, font type, font style, color, filtering options, menu design, and exemplary selection choices are provided merely as one embodiment in which a GUI of the MCF application may be configured and are not intended to reduce the scope of the appended claims.

The illustrated GUI 600 shows that an option has been selected to enable presence-based message content filtering for text content. Other options are available to enable location-based message content filtering as an alternative to or in addition to the presence-based filtering option, as described above.

The illustrated GUI 600 also includes options to use a default presence profile, set a custom presence profile, or create a new presence profile. A presence profile includes presence statuses and filtering conditions for each presence status. For example, a presence status of not available may include a filtering condition to ban all content and a presence status of not available may include a filtering condition to allow all content. In some embodiments, a user's presence status is updated manually by the user. In alternative embodiments, a user's presence status is updated automatically based upon a predefined condition, such as a location, a time, a particular application being used on the mobile device 200, a minute or data usage condition, (e.g., presence status is not available if minute and/or data usage for a billing period has exceeded a specified amount), a battery life condition (e.g., presence status is not available if battery level is near, at, or below a specified minimum).

The illustrated GUI 600 also includes filtering rule settings. As illustrated, a user may select a presence status for the active presence profile and apply at least one filtering condition for that presence status. This process may be repeated for each presence status defined for the active presence profile. An option for adding new filtering conditions is also illustrated. In the illustrated example, a user has selected Not Available as the presence status and has applied a Ban-List A filtering condition, indicating that when the user's active profile is Custom Presence Profile 2 and the user's presence status is set to Not Available, any message content that is included in list A is modified so as to be indiscernible to the user and other potential viewers/listeners until the user's presence status changes to a new presence status which does not include a similar filtering condition.

The aforementioned embodiments often describe message content filtering performed at a mobile device (e.g., the mobile device 200). Alternative embodiments are contemplated in which message content filtering is performed at a network element, such as, for example, an SMSC, an MMSC, or a dedicated filtering server configured to filter message content.

In one such embodiment, a message content filtering (MCF) application is stored in a memory of the network element and is configured to perform filtering functions consistent with the functions performed by the MCF application as described above with reference to FIGS. 3 and 4. For example, while FIG. 3 is described with reference to an MCF application stored on the mobile device 200, in some embodiments, the network element uses a similar MCF application to perform like functions at the network level. It is contemplated that the steps of the method 300 illustrated in FIG. 3 may be performed by the network element as opposed to the mobile device 200. Some steps, however, may require slight modification.

For example, the step illustrated in block 302 may be replaced with a step for receiving a message directed to the mobile device 200. After the message is received, the network element determines a current location of the mobile device using the MCF application stored in the network element to communicate with a location server to obtain location information for the mobile device 200 so as to be consistent with block 304. The step illustrated in block 312 for presenting only the appropriate portion of the message content to the user may be replaced with a step sending the appropriate portion of the message content in a first message to the mobile device 200. Similarly, the step illustrated in block 318 for presenting the message content to the user may be replaced with a step for sending the message content in a second message to the mobile device 200. The message content in the second message may include the entire original message or only the new content not previously sent in the first message. In the latter example, the mobile device 200 is configured to combine the message content of the first message and the new message content of the second message.

In another embodiment, the SMSC, or the MMSC, where appropriate, receives a message and sends the message to a dedicated filtering server. The dedicated filtering server determines, based upon a filtering rule, whether the message includes inappropriate message content. If the message includes inappropriate message content, the dedicated filtering server modifies the message content as described above.

In another embodiment, the network element receives a message and modifies the message to include an indication that the message must be modified after it is received at the mobile device 200. If the short message peer-to-peer (SMPP) protocol is used, for example, the user data header (UDH) may be modified to include the indication that the message should be modified based upon a particular filtering rule known to the mobile device 200. In this example, the mobile device 200 receives the message, checks the UDH, and modifies the message based upon the filtering rule identified in the UDH. Alternatively, the network element adds message modification instructions to the message header or message body. In this alternative, the mobile device 200 modifies the message according to the instructions, removes the instructions, and presents the modified message to the user.

The above embodiments are equally applicable to message content being filtered based upon filtering rules established for a user's presence status. In this case, the network element communicates with a presence server to obtain current and subsequent presence statuses for a user and proceeds according to the method 400 of FIG. 4. Some steps of the method 400, however, may require slight modifications similar to those described above with reference to a modified method 300.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

We claim:

1. A computer-readable storage medium that stores computer-executable instructions that, when executed by a processor of a mobile device, cause the mobile device to perform operations comprising:
   presenting, on a display of the mobile device, a graphical user interface of a message content filtering application, wherein the graphical user interface of the message content filtering application comprises a filtering rule setting comprising a banned location and a filtering condition for when the mobile device is located within the banned location;

receiving, via the graphical user interface of the message content filtering application, input to apply the filtering rule setting;

receiving a message comprising message content;

determining a current location of the mobile device;

comparing the current location of the mobile device to the banned location;

in response to the current location matching the banned location, filtering the message content in accordance with the filtering condition thereby creating a filtered message; and presenting, on the display of the mobile device, the filtered message.

2. The computer-readable storage medium of claim 1, wherein the filtering condition defines inappropriate content.

3. The computer-readable storage medium of claim 2, wherein filtering the message in accordance with the filtering condition thereby creating the filtered message comprises removing the inappropriate content from the message.

4. The computer-readable storage medium of claim 2, wherein filtering the message in accordance with the filtering condition thereby creating the filtered message comprises blocking the inappropriate content in the message.

5. The computer-readable storage medium of claim 2, wherein filtering the message in accordance with the filtering condition thereby creating the filtered message comprises altering the inappropriate content in the message.

6. The computer-readable storage medium of claim 1, wherein the graphical user interface further comprises a safe location; and wherein the operations further comprise:

determining a new location of the mobile device, wherein the new location is different from the current location;

comparing the new location of the mobile device to the safe location;

in response to the new location matching the safe location, undoing the filtering thereby returning the filtered message to the message comprising the message content; and presenting, on the display of the mobile device, the message.

7. The computer-readable storage medium of claim 1, wherein the graphical user interface further comprises:

an apply text filtering option that, when enabled, filters text content in accordance with the filtering condition;

an apply multimedia filtering option that, when enabled, filters multimedia content in accordance with the filtering condition;

a location creation menu that allows a user to create a new safe location and a new banned location;

a saved safe location menu that allows the user to select a saved safe location previously created via the location creation menu;

a saved banned location menu that allows the user to select a saved banned location previously created via the location creation menu; and an apply filtering condition menu that allows the user to select from a plurality of filtering conditions to apply to the saved safe location or the saved banned location.

8. A computer-readable storage medium that stores computer-executable instructions that, when executed by a processor of a mobile device, cause the mobile device to perform operations comprising:

presenting, on a display of the mobile device, a graphical user interface of a message content filtering application, wherein the graphical user interface of the message content filtering application comprises a filtering rule setting comprising a presence status and a filtering condition for when the mobile device is set to the presence status;

receiving, via the graphical user interface of the message content filtering application, input to apply the filtering rule setting;

receiving a message comprising message content;

determining a current presence status of the mobile device;

comparing the current presence status of the mobile device to the presence status;

in response to the current presence status matching the presence status, filtering the message content in accordance with the filtering condition thereby creating a filtered message; and presenting, on the display of the mobile device, the filtered message.

9. The computer-readable storage medium of claim 8, wherein the filtering condition defines inappropriate content.

10. The computer-readable storage medium of claim 9, wherein filtering the message in accordance with the filtering condition thereby creating the filtered message comprising removing the inappropriate content from the message.

11. The computer-readable storage medium of claim 9, wherein filtering the message in accordance with the filtering condition thereby creating the filtered message comprising blocking the inappropriate content in the message.

12. The computer-readable storage medium of claim 9, wherein filtering the message in accordance with the filtering condition thereby creating the filtered message comprises altering the inappropriate content in the message.

13. The computer-readable storage medium of claim 8, wherein the graphical user interface further comprises a further presence status; and wherein the operations further comprise:

determining a new presence status of the mobile device, wherein the new presence status is different from the current presence status;

comparing the new presence status of the mobile device to the further presence status;

in response to the new presence status matching the further presence status, undoing the filtering thereby returning the filtered message to the message comprising the message content; and presenting, on the display of the mobile device, the message.

14. A mobile device comprising:

a display;

a processor; and a memory that stores instructions of a message content filtering application that, when executed by the processor, cause the mobile device to perform operations comprising presenting, on the display, a graphical user interface of the message content filtering application, wherein the graphical user interface of the message content filtering application comprises a filtering rule setting comprising a banned location and a filtering condition for when the mobile device is located within the banned location, receiving, via the graphical user interface of the message content filtering application, input to apply the filtering rule setting, receiving a message comprising message content, determining a current location of the mobile device, comparing the current location of the mobile device to the banned location, in response to the current location matching the banned location, filtering the message content in accordance with the filtering condition thereby creating a filtered message, and presenting, on the display of the mobile device, the filtered message.

15. The mobile device of claim 14, wherein the filtering condition defines inappropriate content.

16. The mobile device of claim 15, wherein filtering the message in accordance with the filtering condition thereby creating the filtered message comprising removing the inappropriate content from the message.

17. The mobile device of claim 15, wherein filtering the message in accordance with the filtering condition thereby creating the filtered message comprising blocking the inappropriate content in the message.

18. The mobile device of claim 15, wherein filtering the message in accordance with the filtering condition thereby creating the filtered message comprises altering the inappropriate content in the message.

19. The mobile device of claim 14, wherein the graphical user interface further comprises a safe location; and wherein the operations further comprise:

determining a new location of the mobile device, wherein the new location is different from the current location;

comparing the new location of the mobile device to the safe location;

in response to the new location matching the safe location, undoing the filtering thereby returning the filtered message to the message comprising the message content; and presenting, on the display of the mobile device, the message.

20. The mobile device of claim 14, wherein the graphical user interface further comprises:

an apply text filtering option that, when enabled, filters text content in accordance with the filtering condition;

an apply multimedia filtering option that, when enabled, filters multimedia content in accordance with the filtering condition;

a location creation menu that allows a user to create a new safe location and a new banned location;

a saved safe location menu that allows the user to select a saved safe location previously created via the location creation menu;

a saved banned location menu that allows the user to select a saved banned location previously created via the location creation menu; and an apply filtering condition menu that allows the user to select from a plurality of filtering conditions to apply to the saved safe location or the saved banned location.

* * * * *